April 6, 1926.  1,579,718

O. J. KUHLKE

APPARATUS FOR CURING TIRE FLAPS OR THE LIKE

Original Filed April 4, 1925

INVENTOR.
Otto J. Kuhlke.
BY ATTORNEY.

Patented Apr. 6, 1926.

1,579,718

UNITED STATES PATENT OFFICE.

OTTO J. KUHLKE, OF AKRON, OHIO, ASSIGNOR TO THE KUHLKE MACHINE COMPANY, OF AKRON, OHIO, A CORPORATION OF OHIO.

APPARATUS FOR CURING TIRE FLAPS OR THE LIKE.

Application filed April 4, 1925, Serial No. 20,608. Renewed February 24, 1926.

*To all whom it may concern:*

Be it known that I, OTTO J. KUHLKE, a citizen of the United States, and a resident of Akron, county of Summit, State of Ohio, have invented certain new and useful Improvements in Apparatus for Curing Tire Flaps or the like, of which the following is a specification.

This invention relates to an apparatus for curing of articles of rubber between heated mold surfaces and expansible bags, the present application being in the nature of an improvement over the device shown in my prior application for Letters Patent Serial No. 16,697, filed March 19, 1925.

My former application above referred to showed and described a form of vulcanizing apparatus for use in the manufacture of endless rubber tire flaps or the like, in which an outer expansible circular jacket is applied about a mold ring, about the outer circumference of which is located a substantially V-shaped groove, the side walls of which are formed by air bags. The inner circumference of the jacket is formed with a V-shaped ring adapted to enter the V-shaped groove, the flap being cured between the jacket and the air bags, the latter being subjected to internal pressure, and the jacket being formed with a central cavity adapted to be steam heated. In my former application the bags were covered with a layer or layers of fabric to form a smooth surface upon the inner circumference of the flap.

My present invention is designed to improve upon the mold construction shown in my former application, the fabric covering layer being dispensed with and the bags being formed in such a manner that they constitute the mold surface.

The principles of the invention herein are shown in the accompanying drawings, in which.

Figure 1:
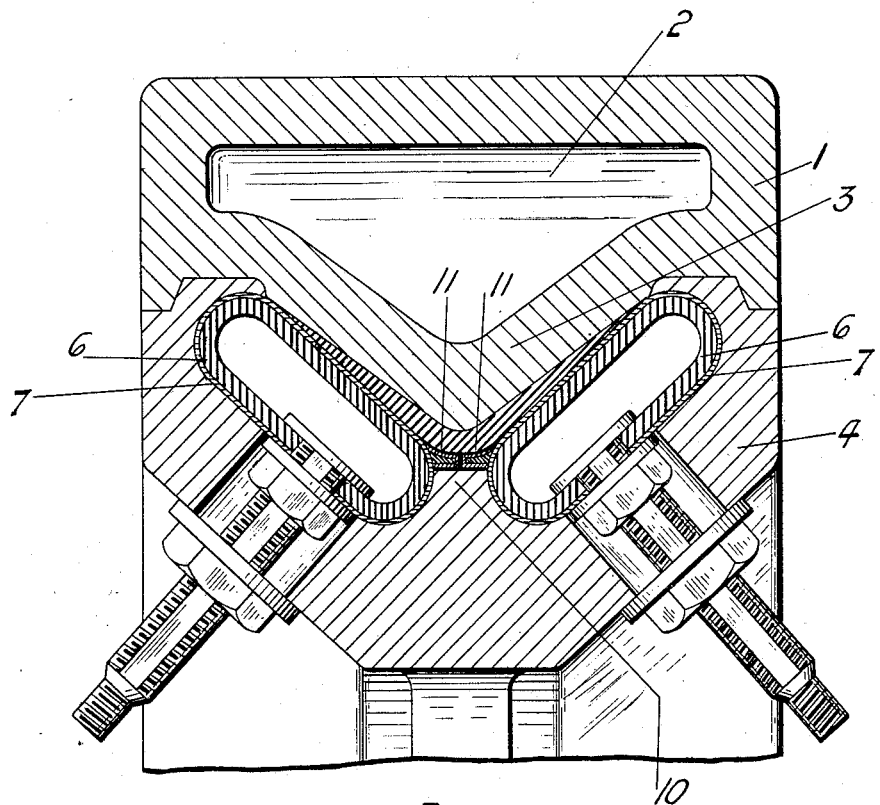
Figure 1 is a sectional view through the mold in closed position.

The complete apparatus is not shown in the present invention and it will suffice to state that the outer jacket or cover plate is indicated by the numeral 1. This may be of any suitable form or shape, as will be understood. The part 1 is chambered, as shown at 2, for the steam which is used to vulcanize the flaps. The inner face of the jacket is provided with the V-shaped rib 3 which forms the outer surface of the flap. The mold is indicated by the numeral 4 and is formed with a corresponding V-shaped cavity.

The side walls of the mold are formed by flexible and expansible bags 6 which lie in recesses 7 on the outer face of the mold. These bags may be of any preferred construction and may be made similarly to the bags commonly used in the curing of pneumatic tires under internal pressure, comprising a wall of rubber 8 and an outer covering of fabric 9 vulcanized together. The bags lie in suitably shaped recesses within the mold and are separated by a central rib or web 10 which, however, terminates slightly below the flap cavity.

Figure 2:
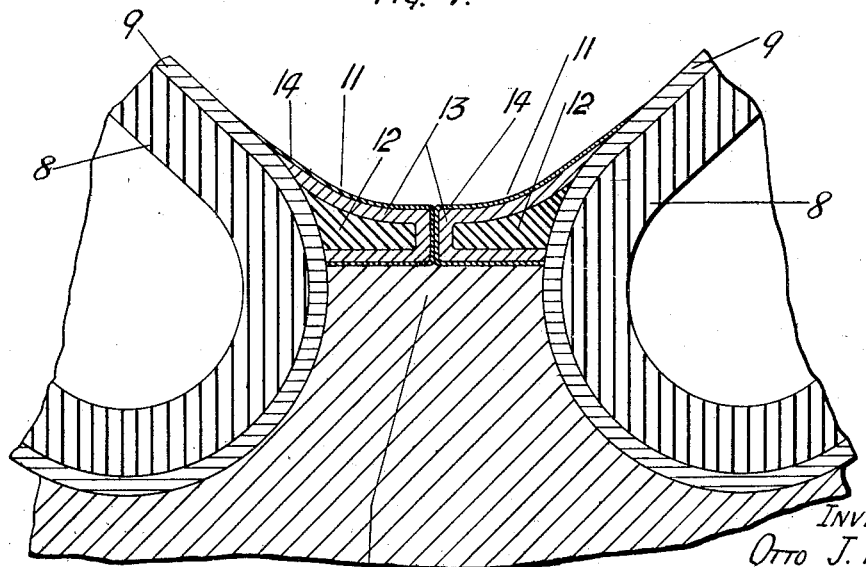
Figure 2 is an enlarged view at the base or vertex of the groove.

It is desirable that the upper surface of the rib 10 be covered, and for this purpose the bags are provided with projecting tips or fillets 11 which lie over the rib and meet at the median line of rib. These fillets are shown in detail in Figure 2 and are formed by rubber inserts 12 which are surrounded by fabric 13 vulcanized upon the bags. In order to obtain sharp meeting faces so as to make the crack between the fillets as small as possible, the fabric layers 13 are heavily coated with rubber, indicated at 14.

It will be understood that in the preferred form of the invention the mold and jacket are circular so that the flap is a circular flap, but the present invention is not necessarily limited to the vulcanization of circular flaps.

It will be understood that changes and modifications may be made in specific embodiments of the invention and the claims are not limited to the exact form herein shown and described.

What is claimed is:

1. In a device for vulcanizing flaps or the like, a mold and a mold plate having a mating groove and rib, respectively, the walls of the groove being formed from expansible bags seated within recesses in the mold, a rib separating the recesses, and integral extensions upon the bags overlying the rib.

2. In a device for vulcanizing flaps or the like, a mold, a chambered mold plate over the mold, the walls of the mold being formed with recesses, expansible bags lying within the recesses, a rib located centrally of the mold, and an extension integral with one of said bags and lying over the rib.

3. In a device for vulcanizing flaps or the like, a mold, a mold plate over the mold, the walls of the mold being formed with recesses, expansible bags lying within the recesses, a rib located centrally of the mold and separating the bags, and integral extensions formed upon the bags and overlying the rib.

4. In a device for vulcanizing flaps or the like, a mold having angularly arranged walls, recesses within the walls, expansible bags within the recesses, a centrally located rib between the recesses, and extensions formed upon a bag and overlying the rib.

5. In a device for vulcanizing flaps or the like, a mold having a recess within a wall thereof, a vulcanized rubber and fabric bag lying within said recess, and an integral vulcanized fillet of rubber and fabric projecting from the bag and overlying a portion of the mold.

OTTO J. KUHLKE.